United States Patent Office 3,318,784
Patented May 9, 1967

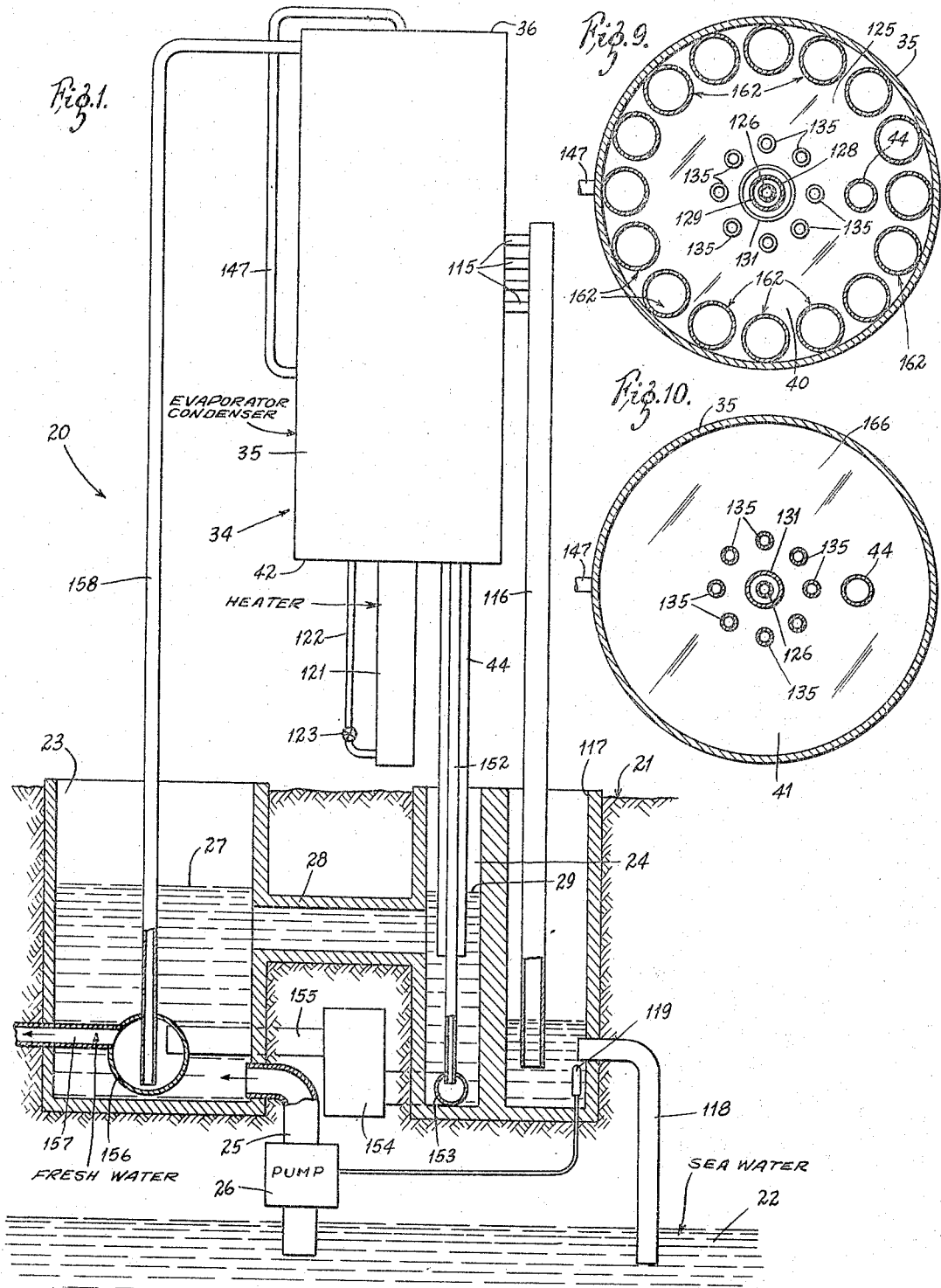

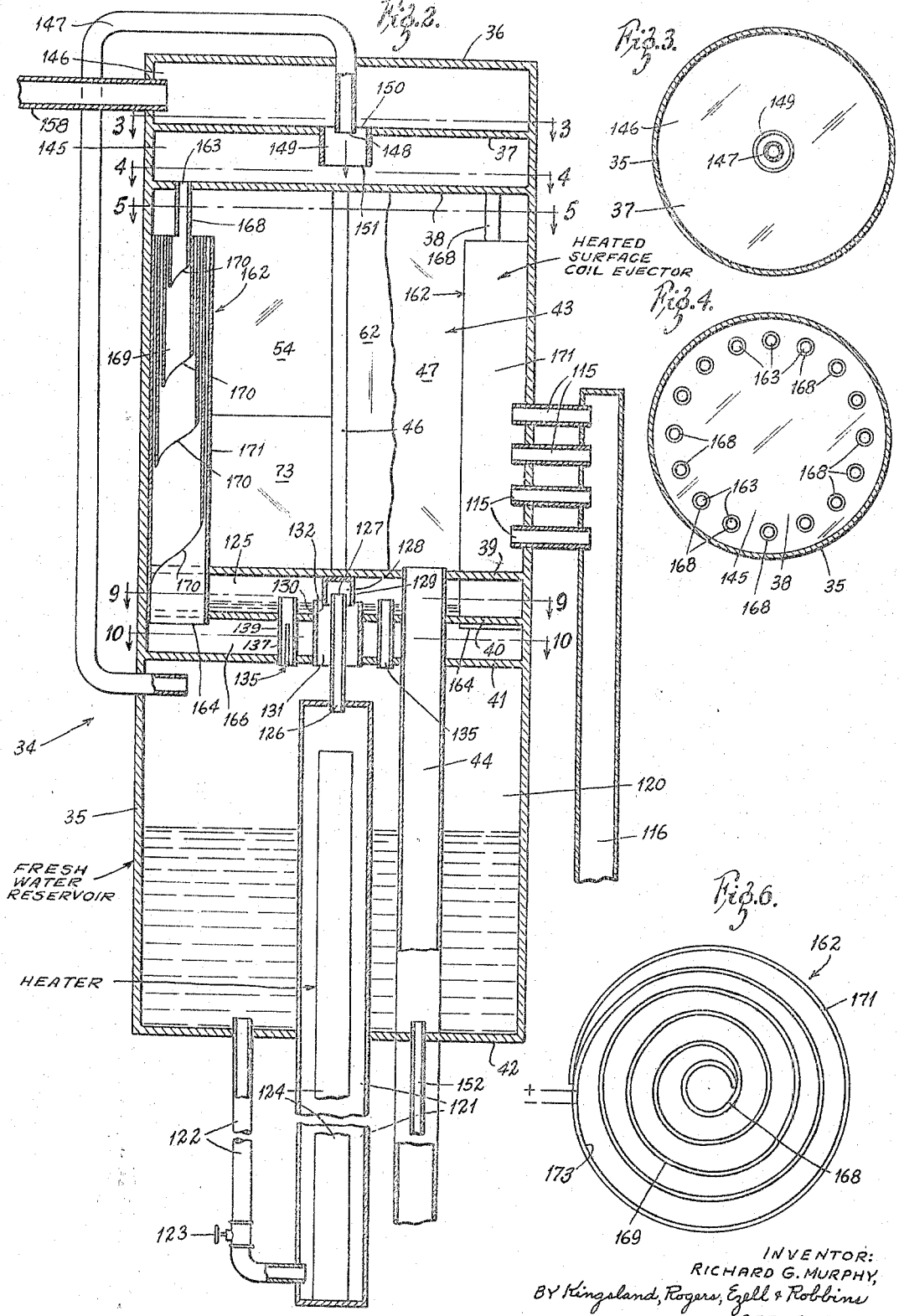

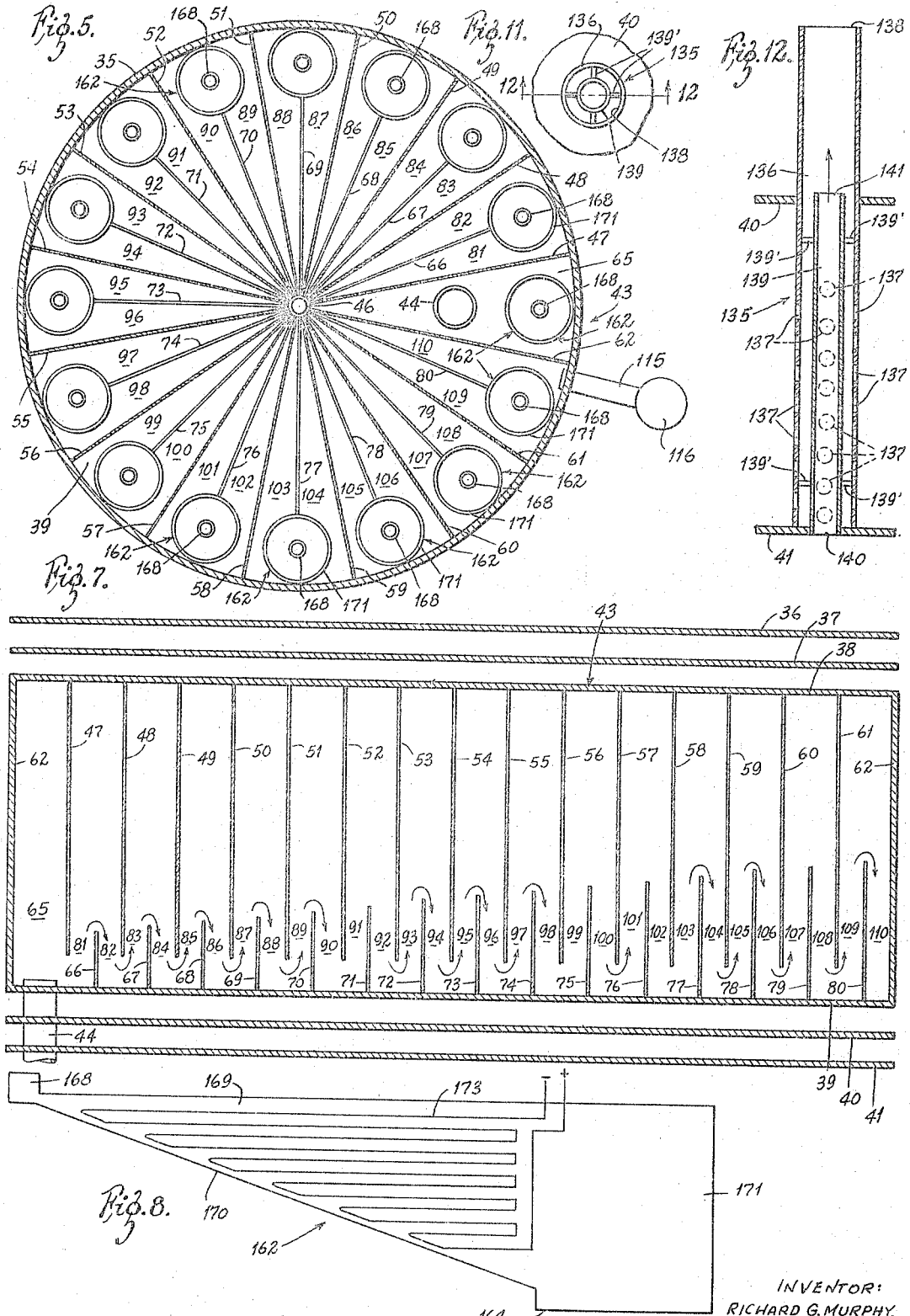

3,318,784
SALT WATER CONVERSION SYSTEM
Richard G. Murphy, 5582 Waterman Ave.,
St. Louis, Mo. 63112
Filed Nov. 1, 1963, Ser. No. 320,702
9 Claims. (Cl. 202—160)

This invention relates to a water conversion system the general object of which is to convert salt water to fresh water in large volumes with maximum efficiency.

In general, the system comprises a large housing that is installed near a large body of salt water, such as an ocean. Water is pumped into a salt water reservoir that is open at the top and is therefore subjected to atmospheric pressure. The conversion unit is supported above the salt water reservoir and houses several chambers, including a unique evaporator. A pipe leads from the salt water reservoir to the evaporator. The evaporator comprises a series of compartments, each of which is closed by the water within it, except for an ejector that extends through each evaporator compartment and opens to a fresh water tank. Water in the fresh water tank is heated and converted to high pressure vapor and is circulated through the ejectors to withdraw air and vapor from the evaporator compartments, thereby creating a very low sub-atmospheric pressure within the compartments. In the low pressure evaporator compartments, the low pressure causes the water in the compartments to boil creating fresh water vapor that is withdrawn by the ejectors and deposited ultimately into the fresh water tank. An important object of the invention is to provide a water conversion system according to the foregoing.

Another object of the invention is to provide a system for converting salt water to fresh water that requires very few valves.

Still another object of the invention is to provide a system for converting salt water to fresh water while removing energy from the salt water in the form of heat energy. Another object is to provide an evaporator for the system that has a plurality of baffles for controlling water flow and thereby controlling the incoming and outgoing water temperatures.

Still another object of the invention is to provide a system for converting salt water to fresh water that can be made in any size to meet any particular requirements of fresh water supply.

Other objects and advantages will be apparent to those skilled in the art.

In the drawings:

FIGURE 1 is a diagrammatic front elevation view of the overall water conversion system with the primary and secondary saline storage tanks shown in section and some tanks and portions of pipes shown in section;

FIGURE 2 is an enlarged view of the conversion unit in vertical section;

FIGURE 3 is a view in section on a reduced scale taken along the line 3—3 of FIGURE 2;

FIGURE 4 is a view in section on a reduced scale taken along the line 4—4 of FIGURE 2;

FIGURE 5 is a view in section on an enlarged scale taken along the line 5—5 of FIGURE 2, but indicating only diagrammatically the positions of the large ejectors;

FIGURE 6 is a plan view on an enlarged scale of a large ejector;

FIGURE 7 is a view in section looking radially inwardly along a circular line just inward of the large ejectors of FIGURE 5;

FIGURE 8 is a plan view of an unwrapped large ejector;

FIGURE 9 is a view in section on a reduced scale taken along the line 9—9 of FIGURE 2;

FIGURE 10 is a view in section on a reduced scale taken along the line 10—10 of FIGURE 2;

FIGURE 11 is a plan view on an enlarged scale of a small ejector; and

FIGURE 12 is a view in section taken along the line 12—12 of FIGURE 11.

Referring now to FIGURE 1, the system 20 is preferably installed on a hill 21 adjacent a large body of salt water 22, such as an ocean. There are two large saline water tanks or reservoirs, a primary saline water reservoir 23 and a secondary saline water reservoir 24.

A pipe 25, the lower end of which is submerged below the ocean level, is connected through the side of the primary saline water reservoir 23. A pump 26 in the pipe 25 pumps salt water from the ocean 22 into the reservoir 23. The capacity of the pipe 25 and the pump 26 are such that the water is always supplied to the reservoir 23 at least to some predetermined level 27 even though water is removed from the system in ways to be described. A pipe 28 positioned below the water level 27 in the reservoir 23 connects the reservoirs 23 and 24. Since the reservoirs 23 and 24 are open at their upper ends to atmospheric pressure, water flows by gravity from the reservoir 23 to the reservoir 24 and tends to establish a level 29 that is equal to the level 27 in the reservoir 23.

A conversion unit 34 is mounted above the reservoirs 23 and 24. While no structure is shown for supporting the conversion unit 34, it will be understood that conventional structural supports are provided for this purpose.

The conversion unit 34 comprises a large housing defined by a side wall 35 illustrated as being cylindrical, although other shapes are possible. There are several horizontal walls 36, 37, 38, 39, 40, 41 and 42 within the cylindrical side wall 35 that divide the housing into compartments for purposes to be described. Except where otherwise noted, each of the compartments thus defined is completely fluid tight.

Two of the walls 38 and 39 define the upper and lower sides of an evaporation chamber 43. There is a pipe 44 extending from below the water level 29 in the secondary saline water reservoir 24 through the walls 40 and 41 into communication with the evaporation chamber 43.

As shown in FIGURE 5, the evaporator chamber 43 is provided with a central tube 46 that serves as a central mounting post for a plurality of radially outwardly extending walls 47, 48, 49, 50, 51, 52, 53, 54, 55, 56, 57, 58, 59, 60, 61 and 62. These walls extend outwardly to the cylindrical side wall 35 and upwardly to the wall 38. However, as clearly shown in FIGURE 7, their lower edges terminate above the wall 39 and are uniformly spaced therefrom, except for the wall 62 which extends to the wall 39.

Between the walls 47 and 62, a water compartment 65 is defined. The pipe 44 leading from the secondary saline water reservoir 24 extends into this compartment 65. Between each of the other pairs of walls 47–62, there are divider walls 66, 67, 68, 69, 70, 71, 72, 73, 74, 75, 76, 77, 78, 79 and 80 of progressively increasing height from the wall 39. The walls 47–62 and the walls 66–80 thus define a plurality of compartments 81, 82, 83, 84, 85, 86, 87, 88, 89, 90, 91, 92, 93, 94, 95, 96, 97, 98, 99, 100, 101, 102, 103, 104, 105, 106, 107, 108, 109 and 110.

As will be described hereinafter, very low sub-atmospheric pressures are maintained within the compartments 81–110. The height of the walls 66–80 are determined by these pressures and by the column of water in the pipe 44 that is maintained by the atmospheric pressure upon the water surface 29 in the reservoir 24. In any event, the top of the highest divider wall 80 is less than 33 feet, 1 inch, above the water level 29.

There are a plurality of small outlet pipes 115 connected through the cylindrical side wall 35 into communication with the compartment 110. The small outlet pipes 115 communicate with a larger vertical pipe 116 that leads downwardly to a large outlet reservoir 117. A pipe 118 leads from the outlet reservoir 117 back to the ocean 22. A thermostat 119 that controls the operation of the pump 26 is submerged in the water in the outlet reservoir 117 and is positioned near the pipe 118.

The horizontal walls 41 and 42 at the lower end of the conversion unit housing define a large fresh water tank 120. A closed heating chamber 121 extends through the bottom wall 42 and upwardly therefrom through the fresh water tank 120. A pipe 122 extends from the bottom wall of the fresh water tank 120 downwardly and connects into the side of the heating chamber 121. There is a valve 123 in the pipe 122 that, when open, allows water to flow by gravity from the fresh water tank 120 to the heating chamber 121. A conventional heating element 124 in the chamber 121 heats water in the chamber and converts the water to high pressure super-heated steam.

The walls 39 and 40 define the upper and lower sides of a condensing chamber 125. A relatively small pipe 126 extends from the top of the heating chamber 121 upwardly through the walls 41 and 40 into the chamber 125. The outlet end 127 of the pipe 126 is spaced somewhat below the wall 39. A cup member 128 is fastened to the lower side of the wall 39. The cup member 128 has a downwardly depending cylindrical side wall 129, the lower edge 130 of which is below the outlet end 127 of the pipe 126. The side wall 129 of the cup member 128 is close to but spaced from the pipe 126 and acts as a director to change the direction of high velocity steam discharging in an upward direction from the pipe 126 to a downward direction along the outer side of the pipe 126. The cross-sectioned area of the space between the side wall 129 of the cup member 128 and the side of the pipe 126 is about the same as the internal cross-sectional area of the pipe. Therefore, the high velocity of super-heated steam moving upwardly in the pipe 126 is maintained after its direction is changed to a downward one.

There is a sleeve 131 extending from the chamber 125 through the walls 40 and 41 into communication with the upper end of the fresh water tank 120. The sleeve 131 is concentric with the pipe 126 and the cylindrical wall 129 of the cup member 128. The upper end 132 of the sleeve 131 is close to, but spaced from, the side wall 129 of the cup member 128 thereby defining an annular restricted opening.

There is a plurality of small ejectors 135 extending from the upper wall 41 of the fresh water tank 120 through the walls 41 and 40 into the chamber 125. As shown in FIGURES 10 and 11, each small ejector 135 comprises a pipe 136 which is about eight inches in diameter and has a plurality of one-inch holes 137 through its side wall. The inlet holes 137 are positioned between the horizontal walls 40 and 41. The outlet 138 from the pipe 136 etxends well above the wall 40.

Coaxial with the pipe 136, and supported within it by a plurality of bars 139', is a smaller pipe 139. The pipe 139 has an inlet end 140 that is below the lowermost ones of the holes 137, and an outlet end 141 that is above the uppermost ones of the holes 137.

There is a chamber 145 defined by the two horizontal walls 37 and 38, and another chamber 146 defined by the two walls 36 and 37. A pipe 147 extends from the upper end of the fresh water tank 120 through the top wall 36, and its outlet end 148 projects at least partly into the chamber 145. A short pipe 149 extends through the wall 37 and is concentric with the pipe 147. The upper end 150 of the pipe 149 is above the lower end 148 of the pipe 147. The lower end 151 of the pipe 149 is considerably below the lower end 148 of the pipe 147.

A pipe 152 is connected into the bottom 42 of the fresh water tank 120. The pipe 152 extends downwardly into the secondary saline water reservoir 24 and connects into another pipe 153 at the lower end of that reservoir. The pipe 153 is connected to the inlet of a generator 154 (shown schematically) the outlet of which is connected by a pipe 155 to a tank 156 in the primary saline water reservoir 23. There is an outlet pipe 157 for drawing fresh water from the fresh water tank 156 and conveying it to some external storage or transporting device (not shown). Another pipe 158 leads from the fresh water tank 156 to the chamber 146 between the horizontal plates 36 and 37.

There is a plurality of large ejectors 162 extending from the chamber 145 through the wall 38 and the evaporator chamber 43, through the walls 39 and 40. Each ejector 162 has an inlet end 163 communicating with the chamber 145 and an outlet end 164 opening to the chamber 166 that is defined by the plates 40 and 41.

Each large ejector 162 comprises a relatively small diameter tube portion 168 extending downwardly from the inlet 163. Beginning at a point spaced below the wall 38, the tube 168 begins to form a spiral wall 169 in a radially outward direction, with the lower edge 170 of the spiral wall defining a helix, except that the outer wall 171 is wound in a cylindrical shape. Each large ejector 162 is formed from a flat sheet that has the shape illustrated in FIGURE 8, and when rolled, has the shape illustrated in FIGURES 2 and 6. The surface of the helical ejector 162 is heated. This is provided by a heating coil 173 that is continuously wrapped across the surface of the ejector, as illustrated in FIGURE 8.

*Operation*

To operate this system, the fresh water tank 120 must be at least partially filled with fresh water. The heater 124 is energized, and water flows through the pipe 122 from the fresh water tank 120 into the heating chamber 121. The heating element 124 heats this water within the chamber 121 and begins converting some of the water to steam. The steam tends to flow out the pipe 126 at the top of the heating chamber 121, but the heating element 124 boils water and converts it to steam at a faster rate than the rate at which the steam escapes through the pipe 126. Therefore, the steam within the chamber 121 is further heated to a superheat condition.

Water is continually supplied to the heating chamber 121 through the pipe 122 as permitted by the pressure check valve 123. Whenever the pressure within the heating chamber 121 reaches a value equal to the pressure exerted by the water from the tank 120 (caused by the water head and the vapor pressure in the tank 121) the check valve 123 automatically closes, blocking the flow of water until enough steam escapes through the pipe 126 to reduce the pressure within the chamber 121. Then the valve 123 again opens admitting more water to the heating chamber 121.

The pressure within the heating chamber 121 gradually builds up to a very high level, above 2000 p.s.i. This extremely high pressure causes the superheated steam to discharge through the small pipe 126 at an extremely high velocity and at very high pressure.

The high velocity steam hits the cup member 129 and its direction is reversed to a downward one along the path between the cylindrical side wall 129 and the outer wall of the pipe 126. As the steam escapes past the lower edge of the cylindrical wall 129, it expands into the larger area within the sleeve 131, reducing its pressure and velocity, and discharges into the fresh water tank 120.

When the steam enters the fresh water tank 120, it expands still further, and its pressure is still further reduced. However, the steam in the tank 120 creates a pressure that is several times the value of atmospheric pressure, perhaps about one-tenth the pressure that exists within the heating chamber 121. The steam is also hot and it heats the water within the tank 120 as well as the walls of the tank 120, including the wall 41.

Some of the steam flows from the tank 120 through the pipe 147 to the outlet end 148 of the pipe 147. The steam discharges into the larger area defined by the short pipe 149 and its pressure is therefore considerably reduced. The vapor passes to the inlets 163 to the tubes 168, and because there are a large number of these tubes 168 (sixteen being shown in the drawings), the pressure of the vapor is still further reduced.

What happens to the vapor in the tubes 168 is determined in part by another action that takes place upon the vapor within the fresh water tank 120. Some of the vapor from the fresh water tank 120 enters the inner pipes 139 of the small ejectors 135 (See FIGURES 10 and 11). Since the high velocity steam from the heating chamber 121 is flowing rapidly past the space between the tube 131 and the cylindrical wall 129, a low pressure area is created that draws air and vapor from the compartment 166, reducing the pressure within the compartment 166. The vapors that enter the tubes 139 of the small ejectors 135 therefore travel at a high rate of speed toward the compartment 125. As the high speed vapors reach the larger area within the outer pipes 136 above each inner pipe 139, the pressure is further reduced. The action of this high velocity low pressure vapor draws air and vapor from the compartment 166 through the small holes 137 into the outer pipe 136, bringing the pressure within the compartment 166 down to a very low value, at least relative to the pressure in the compartment 145.

The vapor that had entered the small tubes 168 at the inlets to the large ejectors 162 flows downwardly toward the low pressure compartment 166. As the vapor flows downwardly, it is gradually expanded by the gradually increasing area provided by the spirally wound sheet having the helical lower edge 170. It is also heated by the heating element 173, increasing the velocity of the vapor. As it expands, the pressure of the vapor is gradually reduced, thereby encouraging the vapor to flow downwardly through the large ejectors 162. When the vapor reaches the low pressure compartment 166, it is drawn into the small holes 137 and ejected through the small ejectors 135 into the chamber 125.

The upper wall 39 of the chamber 125 is in contact with water in the evaporator 43 (the sequence of operations that puts water in the evaporator 43 being presently described). This water is cold as a result of the evaporation process and cools the plate 39, thereby cooling the vapor within the compartment 125. Since the pressure within the compartment 125 is higher than the pressure within the compartment 166, and the temperature is lower, much of the vapor within the compartment 125 condenses into liquid. The liquid and vapor are ejected from the compartment 125 to the space between the tube 131 and the cylindrical wall 129, as has been described.

All of the foregoing action takes place when the heater element 124 is energized. It is also necessary, before the system can operate, to have a body of salt water within the primary and secondary saline water reservoirs 23 and 24. This supply of salt water is obtained from the ocean 22 and pumped through the pipe 25. When the water within the reservoirs 23 and 24 reaches predetermined levels 27 and 29, the atmospheric pressure upon these water bodies begins to force water up the pipe 44. The height of water within the pipe 44 is determined by the difference in pressure between atmospheric pressure upon the surfaces 27 and 29 and the pressure at the upper end of the pipe 44, which is within the evaporator compartment 65. The pressure within the evaporator compartment is controlled as follows.

As the vapor is passing downwardly from the chamber 145 through the large ejectors 162, it is creating reduced pressures at the inlets 169 to these large ejectors 162, which inlets are located within the several evaporator chambers 65 and 81–110. The action of these vapors produces an ejecting action within these evaporator compartments, drawing air and whatever vapor exists in the evaporator chambers from the compartments into the large ejectors 162. This drawn air and vapor are carried through the large ejectors 162 to the chamber 166. As the air and vapor pass through the large ejectors 162, the heaters 173 greatly accelerate the air and vapor molecules. The action of the large ejectors 162 therefore reduces the pressure within the evaporator chambers 65 and 81–110 to less than about four mm. Hg.

At this point it will be noted that the plates 66–80 are of progressively increasing height, but the upper edge of the highest plate 80 is less than 33 feet, 1 inch, above the salt water surface 29 in the reservoir 24, and particularly is less than the height of water that is supported by the atmospheric pressure upon the surfaces 27 and 29 in the saline water tanks 23 and 24. The same is true of the upper edges of the remaining plates 66–79. Each is below the level of water within its respective evaporator chamber as determined by the amount of subatmospheric pressure maintained within such chamber by the large ejectors 162.

Now, with this low pressure condition within the chamber 65 into which the pipe 44 opens, water is pressed upwardly through the pipe 44 and into the chamber 65 to a level above the lower edge of the plate 47. At this time, the portion of the chamber 65 above the level of water within the chamber is acted upon by the large ejector 162 therein. The action of the ejector 162 within the chamber 65 continues to reduce the pressure within that chamber. The water within the chamber 65 boils, removing some heat from the remaining water in the chamber 65 and reducing the temperature of that remaining water. As the water level rises within the chamber 65, it rises within the chamber 81. Evacuation of air and vapor from the chambers 81 and 82 reduces the pressure below that within the chamber 65 sufficiently to raise the water in the chamber 81 to a level that exceeds the height of the divider plate 66, so water spills over the top of the plate 66 into the chamber 82. The large ejector 162 in the chambers 81 and 82 continues to maintain an extremely low pressure within the chambers 81 and 82, keeping the water level within those chambers above the plate 66 and above the lower edges of the plates 47 and 48. Therefore, the chamber above the water between the plates 47 and 48 is a closed one and subject to its own pressure. Since the water within this chamber has a lower heat content than the water in the chamber 65, and is at a lower pressure, it boils at a lower temperature. Therefore, the water level between the plates 47 and 48 is always a little higher than the water level in the chamber 65. The progressively higher plates 67–80 assure that temperatures are accurately controlled. As water flows from one compartment to the next, say from the compartment 86 to the compartment 87, the water has a certain heat content and a certain temperature at which it boiled in the compartment 86 (and 85). But the plate 69 is higher than the plate 68, so water will not flow over the plate 69 until the pressure above that plate is further reduced to raise the level of water. The large ejector 162 continues to draw air from the chambers 87 and 88, reducing the pressure and raising the water level to the top of the plate 69. At this lower pressure, the water boils at a slightly lower temperature than in the chamber 86. This lower temperature is controlled by the height of the plate 69, because as soon as the water reaches the top of the plate 69, it flows over into the next compartments 88 and 89, and so forth through all the compartments.

The water continues in this way to flow successively into the chambers 84, 85, 86, etc. Because of the extremely low pressures within the evaporator compartments, and because the water therein has been heated somewhat as will be described, the water boils, creating fresh water vapor that is drawn off by the large ejectors 162 according to the operation already described. The system is now operating.

The evaporation process within the evaporator 43 raises the temperature of the vapor and reduces the temperature of the remaining water in progressive amounts as has been described. This succession of separate evaporator compartments creates an efficient evaporator system that permits accurate control of water temperatures and allows the removal of heat energy from the salt water. The heat energy removal is used to operate the heaters and pumps and to supply external energy as will appear. This cooler water flows out of the evaporator through the small pipes 115 into the larger pipe 116 and down into the outlet reservoir 117. The outlet pipe 118 which connects the reservoir 117 into the ocean for returning water to the ocean is located above the lower end of the pipe 116 so that the level of water within the reservoir 117 never drops below the lower end of the pipe 116. Therefore, the vacuum within the evaporator 43 is not broken. On the other hand, the length of the pipe 116 below the small pipes 115 and above the level of water within the reservoir 117 is greater than 33 feet, 1 inch, so that water will flow from the evaporator compartment 110 to the reservoir 117.

As the water level within the evaporator 43 is lowered by the evaporation process and by the withdrawal of water through the pipe 116, the pump 26 operates to replenish the water within the primary and secondary saline water reservoirs 23 and 24, and the atmospheric pressure upon these bodies of water maintains a flow of water into the low pressure evaporator 43. The pump 26 is controlled by a thermostat 119 positioned near the inlet to the pipe 118. The thermostat is set to cause water to be discharged from the outlet reservoir 117 at some predetermined temperature below the temperature of water in the ocean 22, such as 0° C. If the temperature of the water next to the pipe 118 rises above 0° C., it means that the water level within the several compartments 65 and 81–110 has risen too high, and the pressure within these compartments is increased, increasing the boiling temperatures. This is quickly controlled by the pump 26 which stops upon this rise in temperature at the pipe 118. Therefore, as the evaporation process continues, the level of salt water within the reservoirs 23 and 24 drops, and lowers the level of water within the evaporator 43 until the evaporation process again causes the discharged water to be the desired 0° C. Then the thermostat 119 senses that the pump 26 should again pump water into the reservoirs 23 and 24, and the pump is accordingly energized.

As evaporation within the several evaporator compartments takes place, the vapor thus created is drawn off by the large ejectors 162 and carried to the compartment 166 whence it is drawn through the small ejectors 135 into the compartment 125. In the compartment 125, much of the fresh water vapor condenses to liquid. The liquid and remaining vapor are drawn by the venturi effect of the high speed, super-heated steam emerging from the heater compartment 121 through the tube 131 into the fresh water compartment 120. The much higher pressure existing within the compartment 120 maintains a predetermined ratio of liquid and vapor, some of the discharged vapor condensing into liquid and the rest serving as the ejecting vapor through the small ejectors 135 or passing through the pipe 147 to serve as the ejecting vapors for the large ejectors 162.

The pipe 152 continuously withdraws high pressure fresh water from the fresh water tank 120 and carries it to the pipe 153. From the pipe 153, the fresh water flows through the electric generator 154 and thence through the pipe 155 to a fresh water tank 156. Some of the fresh water from the tank 156 flows upwardly through the pipe 158 into the compartment 146 (the high pressure existing within the tank 156 is sufficient to cause this flow). The rest of the fresh water is drawn off through the pipe 157 for external consumption or use.

The generator is driven by the flow of water from the fresh water tank 121. This flow of water is caused by the presence of vapor within the tank 121, and the vapor exists because of the heat gained from the salt water that entered the system at ocean temperature and left the system at about 20° C. below ocean temperature. (The vapor also exists because the heaters 124 and 173 added heat, but the energy for the heaters is supplied by the generator 154. The fact still remains that the overall system has gained heat energy from the salt water.) As the vapor in the tank 121 drives water from the tank 121 to drive the generator 154, it loses heat energy in the form of work. This has a cooling effect upon the water and vapor remaining in the tank 121 and constitutes an effective, useful application of the salt water heat energy to the generation of electrical energy.

Part of the electrical energy generated is used to operate the heaters 124 and 173. The rest may be drawn off for external use.

The fresh water within the fresh water tank 120 is considerably warmer than the incoming salt water from the ocean 22. This warmer fresh water, which is circulated through the pipe 153, the generator 154, the pipe 155, the tank 156 and the pipe 158 below the level of the incoming salt water within the reservoirs 23 and 24, heats the salt water. Therefore, the salt water that is supplied to the evaporator 43 is warmer than the incoming ocean water and evaporates more readily. Conversely, the ocean water cools the fresh water before it is removed from the system through the pipe 157.

Various changes and modifications may be made within the purview of this invention as will be readily apparent to those skilled in the art. Such changes and modifications are within the scope and teaching of this invention as defined by the claims appended hereto.

What is claimed is:

1. A salt water conversion system comprising a housing supported near a body of salt water, a salt water reservoir open to atmospheric pressure, means for pumping salt water from the body of salt water to the reservoir to maintain generally a predetermined level therein, an evaporator above the reservoir, means defining a plurality of compartments in the evaporator connected together in series adjacent their lower ends, means for continuously withdrawing water vapor from each compartment, a pipe connected from the reservoir to the bottom of the first one of the series of compartments, the first compartment being positioned at such a height above the level of water in the reservoir that the atmospheric pressure upon the water in the reservoir maintains a column of water through the connecting pipe and extending above the connection between the first and second compartments of the series, whereby the water surface in the first compartment defines the lower side of a closed compartment, the pressure within which is maintained sufficiently low to cause boiling of the water with continuous replenishment from the reservoir, the successive compartments and the connections between them being similarly elevated with respect to the level of water maintained within them as set forth for the first compartment, whereby the water surface in each compartment defines the lower side of a closed compartment, and the water in each compartment boils because of the low pressure therein, and means for withdrawing salt water from the last compartment of the series, the means for withdrawing vapor from each compartment comprising an ejector having an inlet adjacent the upper side of the compartment and an outlet below the compartment, each ejector comprising a spirally wound wall, the lower edge of which defines a downwardly and outwardly winding helix extending from the inlet to the outlet, and means for circulating high velocity fluid through each ejector to draw water vapor from the evaporator compartments, the resulting mixture of fluid and water vapor being gradually expanded to progressively reduced pressure by the progressively enlarged area provided by the helical lower edge of the spirally wound wall.

2. A system for converting salt water to fresh water comprising an evaporator, means comprising a plurality of baffle walls defining a plurality of individual compartments in the evaporator, including at least first, second and last series of compartments, an inlet to the first compartment, a liquid outlet from the last compartment, means subjected to a predetermined pressure for supplying salt water to the inlet, means for maintaining reduced pressure within the first compartment sufficiently below the said predetermined pressure to cause salt water in the first compartment to reach a predetermined level and sufficiently low to cause the salt water in the first compartment to boil, means below the level of salt water in the first compartment defining a fluid passage between the first and second compartments, means defining fluid passages between the rest of the compartments whereby the fluid passages connect the compartments for flow of the salt water through all the compartments in series from the first to the last, means for maintaining sub-atmospheric pressures within the remaining compartments whereby the salt water reaches predetermined levels and boils in the remaining compartments, and means comprising divider walls extending upwardly between pairs of said baffle walls within said compartments, the successive divider walls being of progressively increasing heights from the first to the last compartments, respectively, over the tops of which the salt water is adapted to flow to cause progressively lower boiling temperatures of the salt water in the series of compartments.

3. The system of claim 2 including a salt water tank below the evaporator, a pipe connected from the outlet to the salt water tank, a thermostat for sensing the temperature of salt water in the tank, and means controlled by the thermostat for regulating the supply of salt water to the inlet.

4. The system of claim 2 including a fresh water tank, and means for conveying the vapor produced by the boiling salt water from the compartments to the fresh water tank, the means for maintaining reduced pressures within the first and remaining compartments comprising a plurality of steam ejectors extending from the compartments for withdrawing vapor from the compartments, means creating high pressure steam from fresh water in the fresh water tank, and means for circulating the high pressure steam through the ejectors to cause withdrawal of the vapor.

5. A system for converting salt water to fresh water comprising an evaporator defined by enclosing walls, means to supply salt water to the evaporator, a fresh water tank containing fresh water, heater means to change some of the fresh water in the tank to high pressure steam, means comprising a steam ejector to reduce the pressure within the evaporator to cause the salt water therein to boil creating fresh water vapor, means for circulating high pressure steam from the fresh water tank through the steam ejector at high velocity, the steam ejector having a vapor inlet located above the liquid level in the evaporator, the area within the ejector adjacent the vapor inlet being subjected to low pressure created by the high velocity steam passing through the steam ejector a receiving chamber for receiving water vapor and condensate, the steam ejector extending through a wall of the evaporator and having an outlet located within the receiving chamber outside the evaporator, and superheated steam venturi means for delivering liquid condensate vapor and steam from the receiving chamber to the fresh water tank.

6. The system of claim 5 plus means to heat the vapor as it passes through the steam ejector to increase the velocity of the vapor.

7. The system of claim 5 wherein the steam ejector comprises a spirally wound plate on a generally vertical axis, the innermost winding of the plate being closed on its side and extending through the upper wall of the evaporator to receive the high pressure steam, the upper edges of the rest of the windings being located inside the evaporator above the liquid level therein, the lower edge of the innermost winding being below the upper edges of the remaining windings and defining the beginning of an expanding helix that continues downwardly and outwardly as defined successively by the remaining windings, the outer winding having a closed side extending through the bottom wall of the evaporator into communication with the means for delivering steam and vapor to the fresh water tank.

8. The system of claim 5 including a closed chamber into which the evaportor outlet opens, a condensing chamber, the means to change some of the fresh water to steam comprising a heater compartment, means for directing the high pressure steam from the heater compartment to the fresh water tank, means utilizing the high pressure steam conveying means for drawing fluid from the condensing chamber to the fresh water tank, and ejector means for drawing vapor from the closed chamber to the condensing chamber.

9. An evaporator comprising a plurality of vertical baffle walls radiating from a common center, the baffle walls defining the sides of a plurality of evaporator compartments, a vertical cylindrical wall having an inner side, the radially outward edges of the baffle walls having fluid-tight connections to the inner side of the cylindrical wall, a horizontal bottom wall having fluid-tight connection to the lower edge of the cylindrical wall, a top wall having fluid-tight connection to the upper edges of the cylindrical wall and the baffle walls, means adjacent the bottom wall defining fluid communication between the evaporator compartments whereby liquid can flow in series from a first one of the compartments through the rest of the compartments, steam ejector means to establish and maintain sub-atmospheric pressure in each compartment, means to supply liquid to the said first compartment, and a plurality of divider walls each positioned in a different evaporator compartment and having its side and bottom edges joined to the side and bottom walls of the compartment, the upper edges of the divider walls being below the tops of the compartments to permit liquid to flow over the upper edges of the divider walls, the upper edge of the divider wall in the first compartment being below the upper edges of the remaining divider walls and the upper edge of each remaining divider wall being above the upper edge of the adjacent preceding divider wall relative to the direction of movement of liquid through the compartments from the first to the last compartment, whereby liquid flowing in series through the compartments must flow over progressively higher divider walls to establish progressively lower boiling temperatures within the evaporators.

References Cited by the Examiner

UNITED STATES PATENTS

| | | | |
|---|---|---|---|
| 2,398,068 | 4/1946 | Worthen et al. | 202—174 |
| 2,441,361 | 5/1948 | Kirgan | 202—181 |
| 2,803,589 | 9/1957 | Thomas | 203—11 X |
| 2,863,501 | 12/1958 | Farnsworth | 203—11 X |
| 2,885,328 | 5/1959 | Williamson | 202—167 X |
| 2,979,442 | 4/1961 | Badger | 203—7 |
| 3,096,255 | 7/1963 | Redenbaugh | 202—234 |
| 3,161,558 | 12/1964 | Pavelic et al. | 202—173 X |
| 3,240,683 | 3/1966 | Rodgers | 202—173 |

NORMAN YUDKOFF, *Primary Examiner.*

F. E. DRUMMOND, *Assistant Examiner.*